United States Patent [19]

Matsubara et al.

[11] Patent Number: 5,267,350
[45] Date of Patent: Nov. 30, 1993

[54] METHOD FOR FETCHING PLURAL INSTRUCTIONS USING SINGLE FETCH REQUEST IN ACCORDANCE WITH EMPTY STATE OF INSTRUCTION BUFFERS AND SETTING OF FLAG LATCHES

[76] Inventors: Kenji Matsubara, Izumi Residence 2-1006, 109-1 Imaizumi, Hadano-shi, Kanagawa-ken; Seiji Nagai, 2016-2 Nurumizu, Atsugi-shi, Kanagawa-ken; Tohru Shonai, Hitachi Dai-4 Kyoshinryo, 14-6, Nishikoigakubo 4-chome, Kokubunji-shi, Tokyo; Akihiro Fuseda, Domitori Shonan 307, 434 Horiyamashita, Hadano-shi, Kanagawa-ken, all of Japan

[21] Appl. No.: 603,998

[22] Filed: Oct. 25, 1990

[30] Foreign Application Priority Data

Oct. 26, 1989 [JP] Japan ................... 1-278983

[51] Int. Cl.5 ............ G06F 9/00; G06F 9/30; G06F 9/312
[52] U.S. Cl. .................. 395/375; 395/250; 364/263.1; 364/260.8; 364/239.6; 364/DIG. 1
[58] Field of Search .......... 395/375, 400, 425, 250

[56] References Cited

U.S. PATENT DOCUMENTS

| | | | |
|---|---|---|---|
| 4,314,332 | 2/1982 | Shiraogawa et al. | 395/425 |
| 4,415,969 | 11/1983 | Bayliss et al. | 395/375 |
| 4,500,959 | 2/1985 | Kubo et al. | 395/375 |
| 4,691,277 | 9/1987 | Kronstadt et al. | 395/400 |
| 4,691,279 | 9/1987 | Danilenko et al. | 395/400 |
| 4,757,445 | 7/1988 | Zolnowsky et al. | 395/375 |
| 4,825,355 | 4/1989 | Kurakazu et al. | 395/375 |

*Primary Examiner*—Robert B. Harrell
*Assistant Examiner*—Alpesh M. Shah

[57] ABSTRACT

An instruction fetch control method is generally arranged so as to have a plurality of instruction buffers, issue an instruction read request to a memory when a part of the instruction buffers becomes in an empty state and store a fetched instruction in the instruction buffer in an empty state. A flag is provided for specifying another instruction buffer which becomes in an empty state after the instruction stored in the instruction buffer is transmitted to a decoder. The quantity of instructions to be stored in the instruction buffer is made variable in accordance with output of the flag latch, and the fetched instruction is stored in the instruction buffer in an empty state. This arrangement enables a plurality of instructions fetched upon an instruction read request to be stored in the empty instruction buffers, thereby reducing the number of read requests issued.

4 Claims, 2 Drawing Sheets

FIG. I

METHOD FOR FETCHING PLURAL INSTRUCTIONS USING SINGLE FETCH REQUEST IN ACCORDANCE WITH EMPTY STATE OF INSTRUCTION BUFFERS AND SETTING OF FLAG LATCHES

BACKGROUND OF THE INVENTION

The present invention relates to an instruction fetch control method and, more particularly, to an instruction fetch method which involves efficiently fetching instructions from a memory and supplying the instructions to an instruction processor which processes a sequence of instructions in order to execute data processing.

Heretofore, instruction processors for data processors have adopted an instruction fetch control in which a plurality of instruction buffers are pre-fetched in order to accomplish instruction processing at a high speed. In the pre-fetch control for pre-fetching instructions, an instruction read request is provided to the memory (hereinafter also referred to as a first instruction fetch) whenever a portion of the instruction buffers is rendered empty as the instruction processing advances, in order to avoid rendering all of the instruction buffers empty. Further, processing performance, when a branch destination instruction read request is given to the plural instruction buffers in processing a branch instruction, when the branch instruction is decoded or when the appearance of a branch instruction is predicted from the processing history (this instruction fetch being hereinafter also referred to as a second instruction fetch; for example, as disclosed in Japanese Patent Unexamined Publication (kokai) No. 59-91,522/1984).

As disclosed in Japanese Patent Unexamined Publication (kokai) No. 62-77,648/1987, for example, for the instruction pre-fetch control of this kind, there is proposed a method which involves issuing an instruction read request to the memory regardless of whether the instruction buffer is in an empty state and accepting the instruction read request in fetching the fetched instruction into the instruction buffer when the instruction buffer is empty, while suppressing the acceptance of the instruction read request when the instruction buffer is not empty.

It is to be noted that, in order to always ensure an adequate quantity of instructions within the instruction buffers, for example, an instruction read request is required to be given whenever an empty capacity reaches eight bytes if the instruction buffer has the capacity of 32 bytes. Therefore, in this case, the quantity of instructions to be fetched upon one instruction read request becomes relatively small.

In the second instruction fetch, as all of the instruction buffers are rendered empty, it is necessary to immediately store the fetched instructions in the instruction buffers. Therefore, in this case, it is desired to fetch as many instructions as possible in one instruction read request.

For these reasons, in conventional pre-fetch control, the amount of instructions to be fetched per one instruction read request is controlled so as to adapt the quantity required for the second instruction fetch, with the impact upon the hardware amount and performance taken into consideration. Therefore, in implementing the first instruction fetch, only a fixed length from the top out of the fetched instruction is stored in the instruction buffer and the rest is left unemployed. For instance, suppose that, when the instruction buffer has the capacity of 32 bytes as in the previous case, 16 bytes of the instruction out of the 32 bytes are fetched by one request. In this case, in the second instruction fetch, the instruction read requests are issued twice, thereby filling the instruction buffer of 32 bytes with the instructions fetched, while in the first instruction fetch, the former 8 bytes out of the 16 bytes fetched are stored in the instruction buffer and the latter 8 bytes are left unemployed.

If a large number of instruction buffers are provided and a branch destination is fetched, a frequency of instruction read request increases as the number of instruction buffers increases. Further, in instances where a branch destination instruction is fetched by predicting the appearance of a branch instruction from the past history, the fetch timing becomes earlier, as compared with the fetching of the branch destination instructions when the branch instruction is decoded, thereby further increasing a frequency of the instruction read requests.

As described hereinabove, in the instruction fetch control in conventional technique, the frequency of the second instruction read request increases when the first instruction is fetched at a constant frequency, thereby causing collision between the instruction read requests. As a result, memory overhead increases, leading to a reduction in overall processing performance.

SUMMARY OF THE INVENTION

Therefore, it is an object of the present invention to provide an instruction fetch control method which is so adapted as to reduce the number of first instruction read requests and as to prevent a decrease in processing performance due to collision between the instruction read requests, thereby improving processing performance.

In order to achieve the above object, the present invention provides an instruction fetch control method to a system having a plurality of instruction buffers. In the system an instruction read request is issued to a memory when a part of the instruction buffers becomes in an empty state and a fetched instruction is stored in the instruction buffer in an empty state.

The method comprises a flag latch for specifying another instruction buffer which become in an empty state after the instruction stored in the instruction buffer is transmitted to a decoder, making a quantity of instructions to be stored in the instruction buffer variable in accordance with output of the flag latch, and storing the fetched instruction in the instruction buffer in an empty state.

In the instruction fetch control method according to the present invention, the instruction processing proceeds in an instruction processor, followed by fetching the instruction from the instruction buffer. As the instruction is fetched and decoded and the decoded instruction is fed to the instruction processor, a flag latch is so set as to correspond to the instruction buffer fetched and a report is given to indicate that the corresponding instruction buffer is in an empty state. When the flag latch is set and the empty instruction buffer is detected, an instruction read request is transmitted to the memory in order to store the instruction in the empty instruction buffer. During a period of time when a response to the instruction read request is returned from the memory, even if a next instruction is fetched from the instruction buffer and it is detected that the succeeding portion of the instruction buffer became empty, the instruction read request for the empty instruction buffer concerned is suppressed until a signal is returned in response to the previous instruction read request from the memory and the fetched instruction is stored in the preceding instruction buffer in an empty state. The response from the memory is returned immediately even if the instruction to be fetched would exist in the memory. However, if a portion of memory of the instruction to be fetched would be paged out and it would not exist in the memory, no response will be returned until block transfer has finished and the instruction is stored in the memory. Hence, when the next instruction is fetched from the instruction buffer and the succeeding instruction buffer became empty during the period of the time until the response is returned from the memory, the instruction fetched is stored in the preceding empty instruction buffer and the succeeding empty instruction buffer when the response has been returned from the memory. If the next instruction would not be fetched from the instruction buffer and the succeeding instruction buffer would not become empty during the period of time when a response is returned from the memory, the instruction fetched from the memory is stored in the preceding empty instruction buffer, a next instruction for the succeeding instruction buffer would not become empty.

Other objects, features and advantages of the present invention will become apparent in the course of the description of the preferred embodiments, which follows, with reference to the accompanying drawings.

DETAILED DESCRIPTION OF THE PREFERRED EMBODIMENTS

Figure 1:
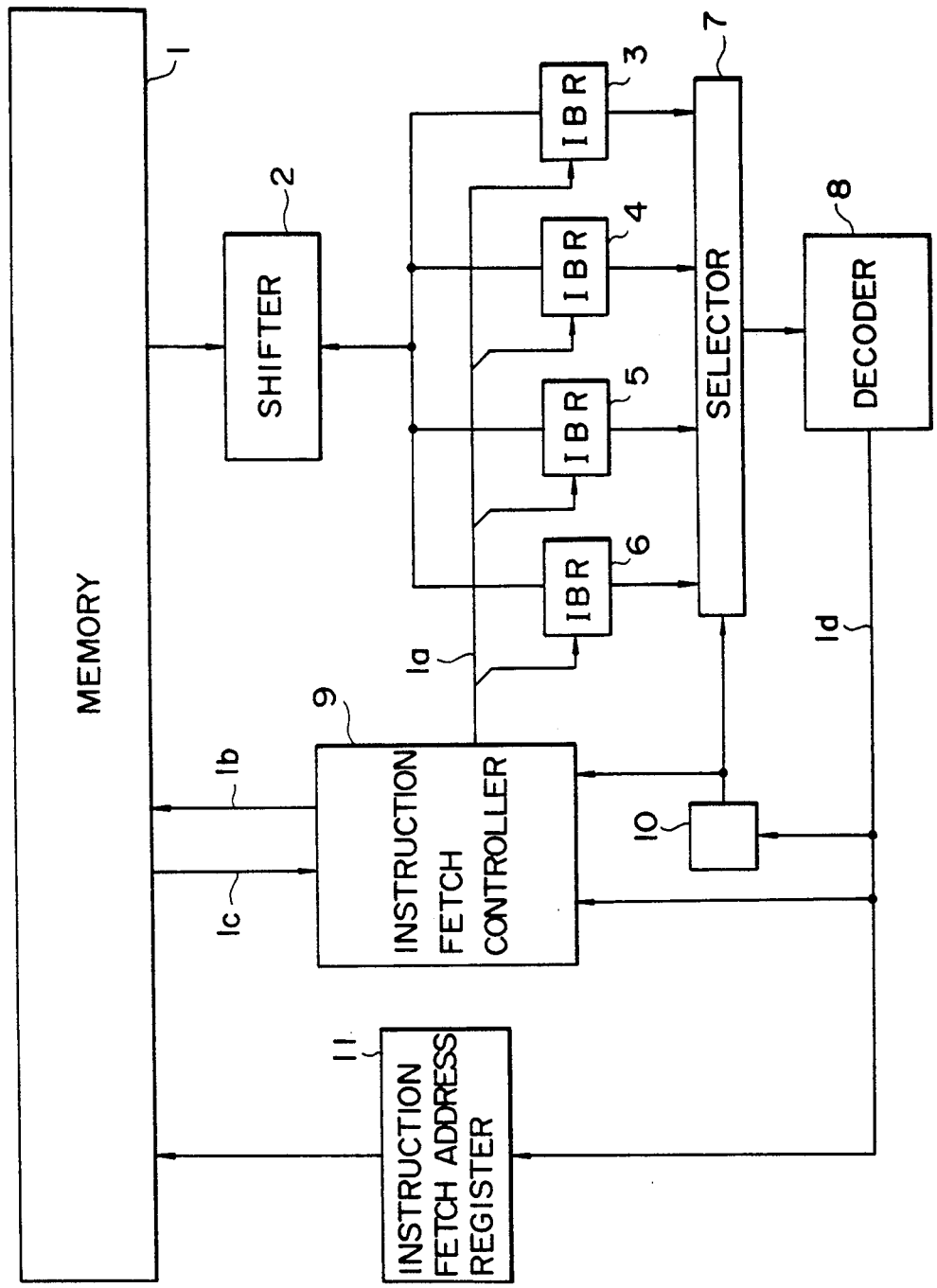
FIG. 1 is a block diagram showing the construction of an essential portion of an instruction fetch control section of data processor according to an embodiment of the present invention.

As shown in FIG. 1, in the construction of the essential portion of the instruction fetch control section of an instruction processor, reference numeral 1 denotes a memory; reference numeral 2, a shifter; 3 to 6, instruction buffer registers; 7, a selector; 8, an instruction decoder; 9, an instruction fetch controller; 10, an instruction fetch pointer; and 11, an instruction fetch address register. The memory 1 stores an instruction sequence (one instruction having a length of 4 bytes) to be processed. The instructions (four instructions) are to be fetched from the memory 1 by one instruction read request. The instructions having a length as long as 16 bytes fetched from the memory 1 are shifted by the shifter 2 in accordance with a fetch address and then fed to each of instruction buffer registers IBR3 to IBR6, inclusive. Each of the instruction buffer registers IBR3 to IBR6 is an instruction buffer register for supplying an instruction of a 4-byte length. One instruction is stored in each of the registers. Hence, the instruction buffer registers IBR3 to IBR6 constitutes an instruction buffer which stores instructions having the capacity of 16 bytes as a whole. It is noted herein that, when one instruction is decoded, one instruction buffer register corresponding to the decoded instruction becomes empty because the instruction length for one instruction is 4 bytes.

Description will now be made of an instruction fetch operation. Suppose that the instruction buffer registers IBR3 to IBR6, inclusive, store instructions and the instruction fetch pointer 10 is pointed to the instruction buffer register IBR3. The instruction stored in the instruction buffer register IBR3 is selected by the selector 7 in response to the selection instruction from the instruction fetch pointer 10 and then inputted into the decoder 8. When the input instruction into the decoder 8 is decoded and a decode signal 1d is turned on, the instruction buffer register IBR3 is rendered empty due to decoding, so that the instruction fetch controller 9 transmits an instruction read request 1b to the memory 1 in order to allow the empty instruction buffer register IBR3 to store a next instruction. At this time, the instruction fetch pointer 10 is increment by the decode signal 1d so as to point to the instruction buffer register IBR4 in which a next instruction is stored. On the other hand, the instruction fetch address of the instruction fetch address register 11 indicates an instruction fetch address in which an instruction of a 4-byte length is added and stored in the instruction buffer register IBR4 to be inputted next into the decoder 8.

A response signal 1c to the instruction read request 1b is to be returned immediately from the memory 1 when the instruction exists in the memory 1. On the other hand, when no instruction exists in the memory 1, a block transfer is implemented to thereby store necessary data in the memory 1 and thereafter the response is to be returned. Hence, in instances where the instruction does not exist in the memory 1, no response will be returned until the block transfer has been finished.

Hence, until the response signal 1c is returned from the memory 1 after the instruction read request 1b has been transmitted, if processing of instructions proceeds and the instruction within the next instruction buffer register IBR4 is decoded and the decode signal 1d is turned on again, the instruction fetch pointer 10 is increased so as to update the content of the instruction fetch address register 11 to an instruction fetch address to be fetched next, in the same manner as in the previous case in which it has been so increased as to point to the instruction buffer register IBR4. At this time, the instruction fetch controller 9 does not transmit the instruction read request for the instruction to be stored in the instruction buffer register IBR4, because the response to the instruction read request for the instruction to be stored in the instruction buffer register IBR3 has not been returned.

Thereafter, when the response signal 1c is returned from the memory 1 prior to the decoding of the instruction within the instruction buffer register IBR5 which stores the next instruction, the instruction fetch controller 9 transmits an instruction store signal 1a to thereby store the fetched instruction in the instruction buffer register IBR3 which has previously been made in an empty state. Then, the instruction fetch controller 9 transmits the instruction store signal 1a to the instruction buffer register IBR4, too, which has been made empty subsequent to the instruction buffer register IBR3.

As described hereinabove, the instruction fetched from the memory 1 after the response signal 1c was returned from the memory 1 is shifted by the shifter 2 in accordance with the fetch address and inputted into the instruction buffer registers IBR3 to IBR6, inclusive, in accordance with the empty state of each instruction buffer register. More specifically, the instruction is stored in the instruction buffer register IBR3 by the instruction store signal 1a to the instruction buffer register IBR3, and the instruction is stored in the instruction buffer register IBR4 by the instruction store signal 1a to the instruction buffer register IBR4. This is to store the fetched instructions in the instruction buffer register IBR3 and 4 which have been rendered empty.

If the instruction in the instruction buffer register IBR4 has not been decoded during a period of time after the transmission of the instruction read request to the instruction buffer register IBR3 up to the return of the response signal from the memory 1, the instruction buffer register which is in an empty state is only the IBR3 and, when the response is returned, the instruction fetched from the memory 1 is stored only in the instruction buffer register IBR3. When the instruction stored in the instruction buffer register IBR4 is decoded and the instruction buffer register IBR4 is rendered empty, a new instruction read request is transmitted in order to store the instruction for buffering in the instruction buffer register IBR4.

Figure 2:
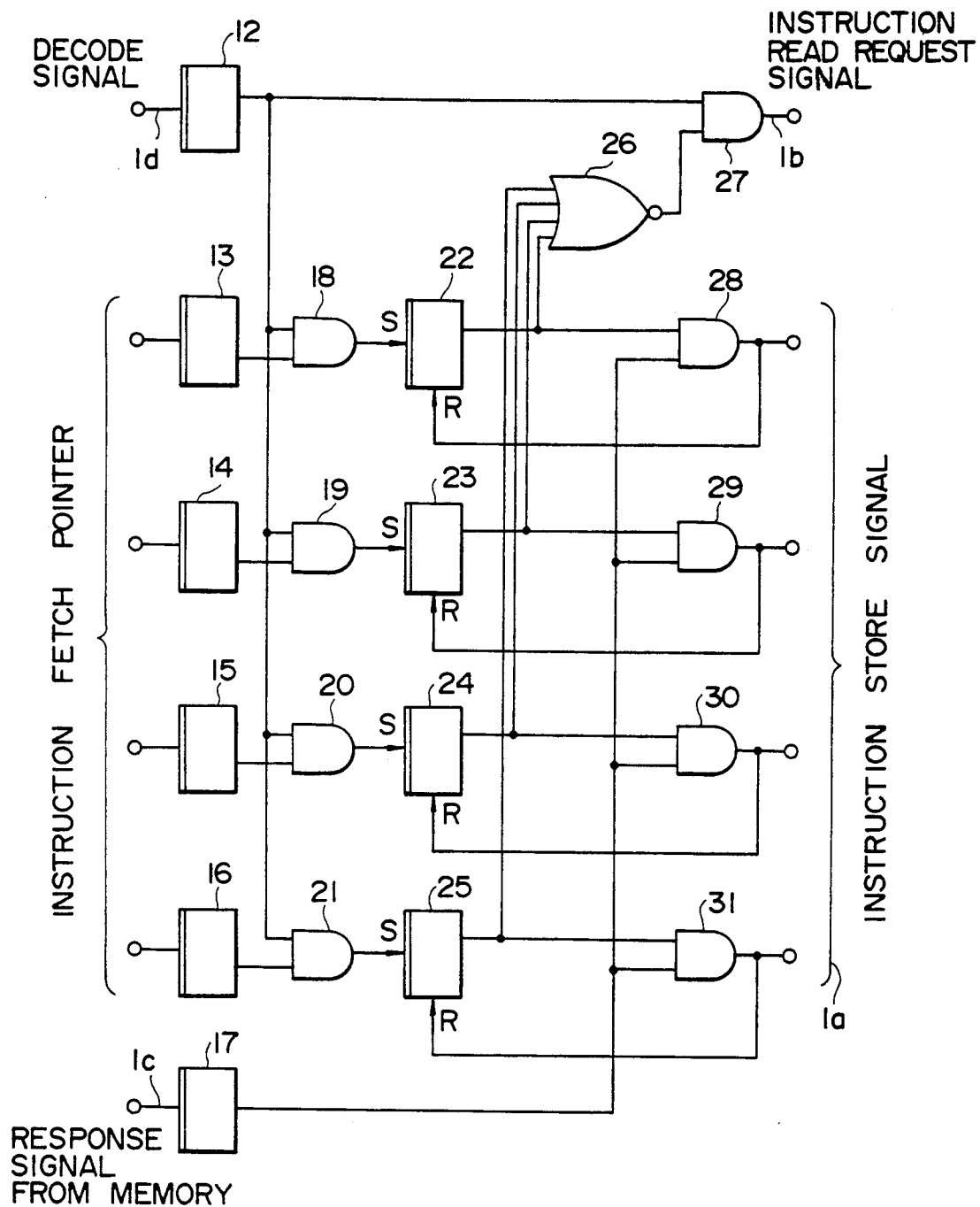
FIG. 2 is a diagrammatic representation of the construction of an instruction fetch controller.

FIG. 2 is a logic circuit showing the construction of the detail of the instruction fetch controller 9. As shown in FIG. 2, reference numerals 12 to 17, inclusive, denote delay latches; reference numerals 18 to 21, inclusive, AND gates; reference numerals 22 to 25, inclusive, flag latches indicative of the empty state of each of the instruction buffer registers so disposed as to correspond to the respective instruction buffer registers IBR3 to IBR6; reference numeral 26, a NOR gate; and reference numerals 27 to 31, inclusive, AND gates. It is noted herein that the decode signal 1d is so arranged as to vary in timing of a phase from the response signal 1c from the memory 1 and as to fail to be turned on currently with the response signal 1c.

When all of the instruction buffer registers IBR3 to IBR6 store instructions, the values of the flag latches 22 to 25 are set to "0". If the instruction in the instruction buffer register IBR3 would be transmitted to the decoder 8 through the selector 7 by means of the instruction from the instruction fetch pointer 10 and it is decoded, the decode signal 1d is generated, thereby turning output of the delay latch 12 on. At this time, all the flag latches 22 to 25 are set to "0" so that output of the NOR gate 26 becomes in an ON state, followed by turning output of the AND gate 27 and transmitting the instruction read request 1b to the memory 1. The data from the instruction fetch pointer 10 serves as output to the delay latches 13 to 16, inclusive. In this embodiment, it is to be noted that, as the data of the instruction fetch pointer 10 points to the instruction buffer register IBR3, only output of the delay latch 13 is turned on, while the rest is turned off. This allows only the output of the AND gate 18 to be turned on and only the flag latch 22 to be set to "1", while the other flag latches 23 to 25, inclusive, are left unchanged at "0".

If processing of instructions proceeds during a period of time before the response is returned from the memory 1 and the next instruction stored in the instruction buffer register IBR4 would be decoded, like the previous cases as described hereinabove, the delay latch 12 is turned on by the decode signal 1d is turned on and the output of the delay latch 14 is also turned on by a signal from the instruction fetch pointer 10, so that the output of the AND gate 19 is turned on, thereby setting the flag latch 23 to "1". It is to be noted herein, however, that no instruction read request 1b is transmitted to the memory 1 at this time because at this time the flag latch 22 has already been set to "1" so that the output of the NOR gate 26 is turned off and the output of the AND gate 27 is turned off, too.

Thereafter, when the response signal 1c is returned from the memory 1 prior to the decoding of the instruction in the instruction buffer register IBR5, the output of the delay latch 17 is turned on. In this case, both of the flag latches 22 and 23 are set to "1", so that the AND gates 28 and 29 are turned on, thereby transmitting the instruction store signal 1a to the instruction buffer registers IBR3 and IBR4, respectively. At this time, after the instruction store signal 1a is transmitted to each of the instruction buffer registers IBR3 and IBR4 through the AND gate 28 and the AND gate 29, respectively, by means of the output of the delay latch 17, the flag latches 22 and 23 are reset to "0" by the respective instruction store signal 1a in correspondence with the transmission of the instruction store signal 1a. Likewise, when processing of instructions proceeds and the instruction stored in the instruction buffer register IBR5 is decoded to thereby generate the decode signal 1d, the delay latch 12 is turned on and the NOR gate 26 is turned on, too, so that the instruction read request 1b is transmitted from the AND gate 27 to the memory 1, in substantially the same manner. When processing of instructions further advances, the instruction read request 1b is transmitted to the memory 1 in substantially the same manner.

As have been described hereinabove, the present invention makes the quantity of instructions to be stored in the instruction buffer variable in accordance with the empty state of the instruction buffer, so that it can store a plurality of instructions fetched upon the instruction read request in the empty instruction buffer in accordance with the empty state of the instruction buffer. This reduces the number of instructions read requests issued and also prevents a reduction in processing performance due to collision between the instruction read requests.

What is claimed is:

1. An instruction fetch control method implemented in a system having a controller, an instruction fetch pointer, a decoder, and an instruction buffer comprising a plurality of instruction buffer registers, the controller issuing a first instruction read request to a memory to fetch instructions when a first of the instruction buffer registers is placed in an empty state and capable of subsequently storing a fetched first instruction in the first instruction buffer register, the method comprising steps of:

determining whether a second instruction buffer register is placed in an empty state, before a response signal is issued from the memory to the controller in response to the first instruction read request, and subsequent to transmission of a selected instruction stored in the second instruction buffer register to the decoder, by performing a logical operation between data of the instruction fetch pointer identifying the second instruction buffer register and a decode signal indicative of completion of decoding by the decoder of the selected instruction;

setting a flag latch in the system for specifying by the controller that the second instruction buffer register is placed in the empty state after the first instruction read request is issued, suppressing transmission of a second instruction read request responsive to an indicative of said flag latch that the second instruction buffer register is in the empty state, returning the response signal to the controller from the memory responsive to the first instruction read request;

selecting a variable quantity of the instructions, fetched from the memory responsive to the first instruction read request and to be stored in the plurality of instruction buffer registers, in accordance with output of the flag latch; and storing the fetched first instruction and a fetched second instruction in the first and second instruction buffer registers respectively in accordance with the selecting and the output of the flag latch; whereby a need for the second instruction read request is obviated by the setting of the flag latch prior to the transmitting of the response signal.

2. The instruction fetch control method as claimed in claim 1, wherein the method further comprises resetting the flag latch by using the response signal issued by the memory after the first instruction read request is issued and used for fetching the fetched first and second instructions from the memory.

3. The instruction fetch control method as claimed in claim 1, further comprising transmitting said first instruction read request to the memory when a previously stored instruction stored in the first instruction buffer register is fetched, feeding the previously stored instruction to the decoder, and generating a second decode signal indicative of completion of decoding the previously stored instruction from the decoder.

4. An instruction fetch control method for a system having a plurality of instruction buffer registers, a memory for storing instructions, an instruction fetch controller, and a plurality of flag latches corresponding to the plurality of instruction buffer registers, the method comprising the steps of:

transmitting an instruction read request by the instruction fetch controller to the memory when a first of the plurality of instruction buffer registers is placed in an empty state;

setting a first of the plurality of flag latches corresponding to the first instruction buffer register by the instruction fetch controller;

determining whether the memory contains the instructions to satisfy the instruction read request;

transmitting a response signal from the memory to the fetch controller if the instructions are present in the memory;

storing a first instruction in the first instruction buffer register in accordance with the setting of the first flag latch;

performing an instruction block transfer to the memory from an external source if the instructions are not present in the memory;

setting a second of the plurality of flag latches corresponding to a second of the plurality of instruction buffer registers which is placed in an empty state after the instruction read request is transmitted and during the instruction block transfer;

transmitting the response signal responding to the instruction read request from the memory to the instruction fetch controller after the setting of the second flag latch and after the instruction block transfer;

storing instructions in the first and second instruction registers in accordance with the setting of the first and second flag latches; whereby a need for a second instruction read request is obviated by the setting of the second flag latch prior to the transmitting of the response signal.

* * * * *

UNITED STATES PATENT AND TRADEMARK OFFICE
CERTIFICATE OF CORRECTION

PATENT NO.    : 5,267,350
DATED         : November 30, 1993
INVENTOR(S)   : Kenji Matsubara, et al.

It is certified that error appears in the above-indentified patent and that said Letters Patent is hereby corrected as shown below:

On the title page, insert the following:

--[73]   Assignee:   Hitachi, Ltd.; Hitachi Microcomputer System Ltd., Tokyo, Japan--; and --Attorney, Agent, or Firm - Fay, Sharpe, Beall, Fagan, Minnich & McKee--

Claim 1, column 7, line 2, delete "indicative" and substitute therefor --indication--.

Signed and Sealed this

Nineteenth Day of April, 1994

Attest:

BRUCE LEHMAN

*Attesting Officer*        *Commissioner of Patents and Trademarks*